US012234960B2

(12) United States Patent
Bae et al.

(10) Patent No.: US 12,234,960 B2
(45) Date of Patent: Feb. 25, 2025

(54) LIGHT EMITTING MODULE WITH LENS CONFIGURED TO HAVE AN AREA THAT OUPPUTS LOWER ILLUMINANCE AND HIGHER DIFFUSION ANGLE THAN ANOTHER AREA AND LAMP COMPRISING THE SAME

(71) Applicant: HYUNDAI MOBIS CO., LTD., Seoul (KR)

(72) Inventors: Jun Seok Bae, Yongin-si (KR); Hyun Hwa Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/364,466

(22) Filed: Aug. 2, 2023

(65) Prior Publication Data

US 2024/0183508 A1 Jun. 6, 2024

(30) Foreign Application Priority Data

Dec. 2, 2022 (KR) ........................ 10-2022-0166982

(51) Int. Cl.
*F21S 41/275* (2018.01)
*F21S 41/29* (2018.01)
*F21W 102/13* (2018.01)
*F21W 102/20* (2018.01)

(52) U.S. Cl.
CPC ........... *F21S 41/275* (2018.01); *F21S 41/295* (2018.01); *F21W 2102/13* (2018.01); *F21W 2102/20* (2018.01)

(58) Field of Classification Search
CPC ...... F21S 41/148; F21S 41/265; F21S 41/275; F21S 41/295; B60Q 1/0041; B60Q 1/18; F21W 2102/13; F21W 2102/135; F21W 2102/20
See application file for complete search history.

(56) References Cited

U.S. PATENT DOCUMENTS

2004/0105275 A1* 6/2004 Sazuka ................. F21S 41/143 362/545
2005/0068787 A1* 3/2005 Ishida ................. F21S 41/151 362/538
2008/0144328 A1* 6/2008 Yagi ...................... F21S 41/143 362/516
2014/0321135 A1* 10/2014 Chen ..................... F21S 41/143 362/231

(Continued)

*Primary Examiner* — Abdulmajeed Aziz
*Assistant Examiner* — Steven Y Horikoshi
(74) *Attorney, Agent, or Firm* — DLA Piper LLP US

(57) ABSTRACT

A light emitting module including a light source and a lens into which a light beam output from the light source is input, through which the light beam passes, and in which the light beam then forms a light distribution pattern and is output, wherein the lens includes a first area that outputs a light beam for forming a first light distribution pattern that is a central portion of the light distribution pattern, and a second area that outputs a light beam for forming a second light distribution pattern that has illuminance lower than that of the first light distribution pattern and is a peripheral portion of the light distribution pattern, and a diffusion angle of the light beam output from the second area in a left-right direction is greater than a diffusion angle of the light beam output from the first area in the left-right direction.

12 Claims, 18 Drawing Sheets

(56) References Cited

U.S. PATENT DOCUMENTS

| | | | | |
|---|---|---|---|---|
| 2017/0151901 A1* | 6/2017 | Sazuka | .................. | F21S 45/47 |
| 2017/0241605 A1* | 8/2017 | Yamamoto | ............ | F21S 41/338 |
| 2019/0203897 A1* | 7/2019 | Kim | ........................ | F21S 41/25 |
| 2022/0299186 A1* | 9/2022 | Inoue | .................. | B60Q 1/1415 |

* cited by examiner

LIGHT EMITTING MODULE WITH LENS CONFIGURED TO HAVE AN AREA THAT OUPPUTS LOWER ILLUMINANCE AND HIGHER DIFFUSION ANGLE THAN ANOTHER AREA AND LAMP COMPRISING THE SAME

CROSS-REFERENCE TO RELATED APPLICATION

This application claims the benefit of priority to Korean Patent Application No. 10-2022-0166982, filed in the Korean Intellectual Property Office on Dec. 2, 2022, the entire contents of which are incorporated herein by reference.

TECHNICAL FIELD

The present disclosure relates to a light emitting module and a lamp including the same.

BACKGROUND

In general, lamps provided in vehicles are designed to form light distribution patterns. The light distribution patterns refer to patterns formed by light beams irradiated from the lamps, and these light distribution patterns are required to satisfy the law. In recent years, lamps that may form light distribution patterns optimized to secure visibility of a driver while the light distribution patterns satisfy the law have been actively developed.

These lamps are roughly classified into headlamps provided on front sides of vehicles and rear lamps provided on rear sides of the vehicles. Among them, the headlamps may determine forward visibility of the driver and aesthetics of the vehicles viewed from the outside.

A lamp according to the related art has a plurality of modules, and a light distribution pattern that satisfies the law has been formed by light distribution patterns formed by the plurality of modules. The lamp according to the related art has a plurality of modules, a lens provided in each of the plurality of modules is designed to have a horizontal focus and a vertical focus that are the same, and thus the lamp has been manufactured to have a large thickness. In this way, the lamp according to the related art has a large volume due to the plurality of modules and the lens having a large thickness, and accordingly, it is difficult to achieve slimming of the lamp.

Thus, in recent years, a demand of the lamp that may be manufactured to minimize the volume of the lamp to slim the lamp and may form the light distribution pattern that satisfies the law is increasing.

SUMMARY

The present disclosure has been made to solve the above-mentioned problems occurring in the prior art while advantages achieved by the prior art are maintained intact.

An aspect of the present disclosure provides a light emitting module in which a light distribution pattern that satisfies the law may be formed using one module, a volume of a lamp may be minimized, and thus the lamp may be slimmed.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a light emitting module includes a light source that outputs a light beam, and a lens into which the light beam output from the light source is input, through which the light beam passes, and in which the light beam then forms a light distribution pattern and is output, wherein the lens includes a first area that outputs a light beam for forming a first light distribution pattern that is a central portion of the light distribution pattern, and a second area that outputs a light beam for forming a second light distribution pattern that has illuminance lower than that of the first light distribution pattern and is a peripheral portion of the light distribution pattern, and a diffusion angle of the light beam output from the second area in a left-right direction is greater than a diffusion angle of the light beam output from the first area in the left-right direction.

Further, a vertical focus and a horizontal focus of the first area may correspond to each other, and a vertical focus and a horizontal focus of the second area may be different from each other.

Further, a second horizontal focal distance that is a separation distance between the horizontal focus of the second area and the second area in a front-rear direction may be smaller than a second vertical focal distance that is a separation distance between the vertical focus of the second area and the second area in the front-rear direction.

Further, a first horizontal focal distance that is a separation distance between the horizontal focus of the first area and the first area in a front-rear direction may be greater than a second horizontal focal distance that is a separation distance between the horizontal focus of the second area and the second area in the front-rear direction.

Further, the first area may include a first light input surface into which the light beam is input and which has a convex shape in a rearward direction that is a direction in which the lens faces the light source, the second area may include a second light input surface into which the light beam is input and has a convex shape in the rearward direction, and a curvature of the first light input surface in a horizontal direction may be smaller than a curvature of the second light input surface in the horizontal direction.

Further, the light emitting module may further include a third area that outputs a light beam for forming a third light distribution pattern having illuminance lower than that of the first light distribution pattern, having illuminance higher than that of the second light distribution pattern, and provided between the first light distribution pattern and the second light distribution pattern.

Further, the first area, the second area, and the third area may be arranged in a vertical direction.

Further, the first area may include a first light output surface from which the light beam is output and which extends in the vertical direction, the second area may include a second light output surface from which the light beam is output and which extends in the vertical direction, the third area may include a third light output surface from which the light beam is output and which extends in the vertical direction, and when the light emitting module is viewed from the side, the first light output surface, the second light output surface, and the third light output surface may have shapes continuously connected to each other in the vertical direction.

Further, the first area, the second area, and the third area may be integrally formed.

Further, a plurality of the light sources may be provided to correspond to the first area, the second area, and the third area.

According to another aspect of the present disclosure, a lamp includes a light emitting module that outputs a light beam for forming one or more of a low beam light distribution pattern and a high beam light distribution pattern, wherein the light emitting module includes a light source that outputs a light beam, and a lens into which the light beam output from the light source is input, through which the light beam passes, and which then outputs the light beam, and the lens includes a first low area that outputs a light beam for forming a first low beam light distribution pattern that is a central portion of the low beam light distribution pattern, a second low area that outputs a light beam for forming a second low beam light distribution pattern that has illuminance lower than that of the first low beam light distribution pattern and is a peripheral portion of the low beam light distribution pattern, a first high area that outputs a light beam for forming a first high beam light distribution pattern that is a central portion of the high beam light distribution pattern, and a second high area that outputs a light beam for forming a second high beam light distribution pattern that has illuminance lower than that of the first high beam light distribution pattern and is a peripheral portion of the high beam light distribution pattern.

Further, the second low area, the first high area, the first low area, and the second high area are sequentially and alternately arranged in a vertical direction.

Further, the light emitting module may include a first light emitting module and a second light emitting module that are spaced apart from each other in a horizontal direction.

Further, a (1-1)th low horizontal focal distance that is a distance between a horizontal focus of a (1-1)th low area that is a first low area of the first light emitting module and the (1-1)th low area and a (1-2)th low horizontal focal distance that is a distance between a horizontal focus of a (1-2)th low area that is a first low area of the second light emitting module and the (1-2)th low area may be different from each other, and a (2-1)th low horizontal focal distance that is a distance between a horizontal focus of a (2-1)th low area that is a second low area of the first light emitting module and the (2-1)th low area and a (2-2)th low horizontal focal distance that is a distance between a horizontal focus of a (2-2)th low area that is a second low area of the second light emitting module and the (2-2)th low area may be different from each other.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
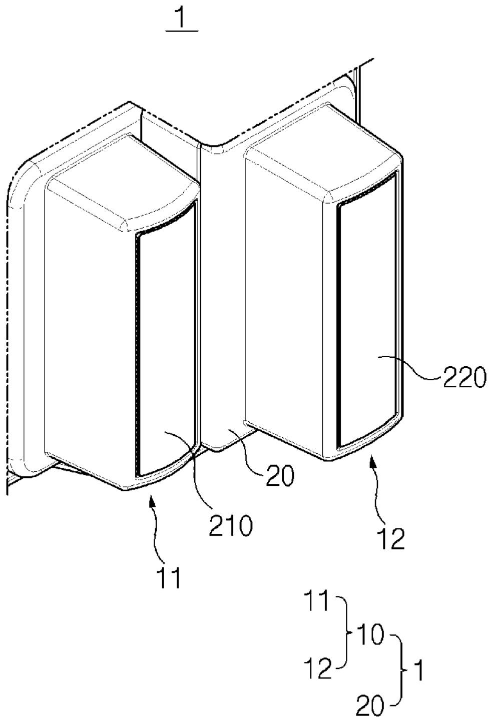
FIG. 1 is a perspective view of a lamp according to a first embodiment of the present disclosure.

Hereinafter, some embodiments of the present disclosure will be described in detail with reference to the exemplary drawings. In adding reference numerals to components of each drawing, it should be noted that identical or equivalent components are designated by an identical numeral even when they are displayed on other drawings. Further, in describing the embodiment of the present disclosure, a detailed description of the related known configuration or function will be omitted when it is determined that it interferes with the understanding of the embodiment of the present disclosure.

Further, in the description of components of the embodiments of the present disclosure, the terms such as first, second, A, B, (a) and (b) may be used. These terms are merely intended to distinguish one component from other components, and the terms do not limit the nature, order, or sequence of the components. It should be understood that when one component is "inserted into" or "extracted from" another component, the former may be directly inserted into or extracted from the latter or a third component may also be "inserted" or "extracted" between the components.

Hereinafter, a lamp 1 according to a first embodiment of the present disclosure will be described with reference to the accompanying drawings.

Referring to FIGS. 1 to 11, the lamp 1 according to the first embodiment of the present disclosure may be a headlamp for securing forward visibility of a driver. The lamp 1 may be a headlamp provided on a front side of a vehicle. Further, the lamp 1 may be provided as a plurality of lamps 1, and the plurality of lamps 1 may be provided on a left side and a right side of the front side of the vehicle. The lamp 1 may include a light emitting module 10 and a lamp body 20.

The light emitting module 10 may irradiate a light beam to the front side of the vehicle. The light emitting module 10 may form at least one of a high beam light distribution pattern, a low beam light distribution pattern, or a combination thereof. The light emitting module 10 may include a first light emitting module 11 and a second light emitting module 12. Alight beam that forms the low beam light distribution pattern may be output from the first light emitting module 11. The first light emitting module 11 may be named a "low beam light emitting module 11". Further, a light beam that forms the high beam light distribution pattern may be output from the second light emitting module 12. The second light emitting module 12 may be named a "high beam light emitting module 12". Further, as an example, the high beam light emitting module 12 may be provided as an intelligent front-lighting system (IFS). Each of the low beam light emitting module 11 and the high beam light emitting module 12 may include a light source 100, a lens 200, a light collector 300, a shield 400, and a partition wall 500.

A light beam may be output from the light source 100. A plurality of light sources 100 may be provided in one lens 200. For example, two or more light sources 100 may correspond to the one lens 200. The plurality of light sources 100 may emit light beams toward a plurality of randomly partitioned areas of the lens 200. As an example, the light source 100 may be a light emitting diode (LED). The light source 100 may include a low beam light source 110 provided in the low beam light emitting module 11.

Figure 2:
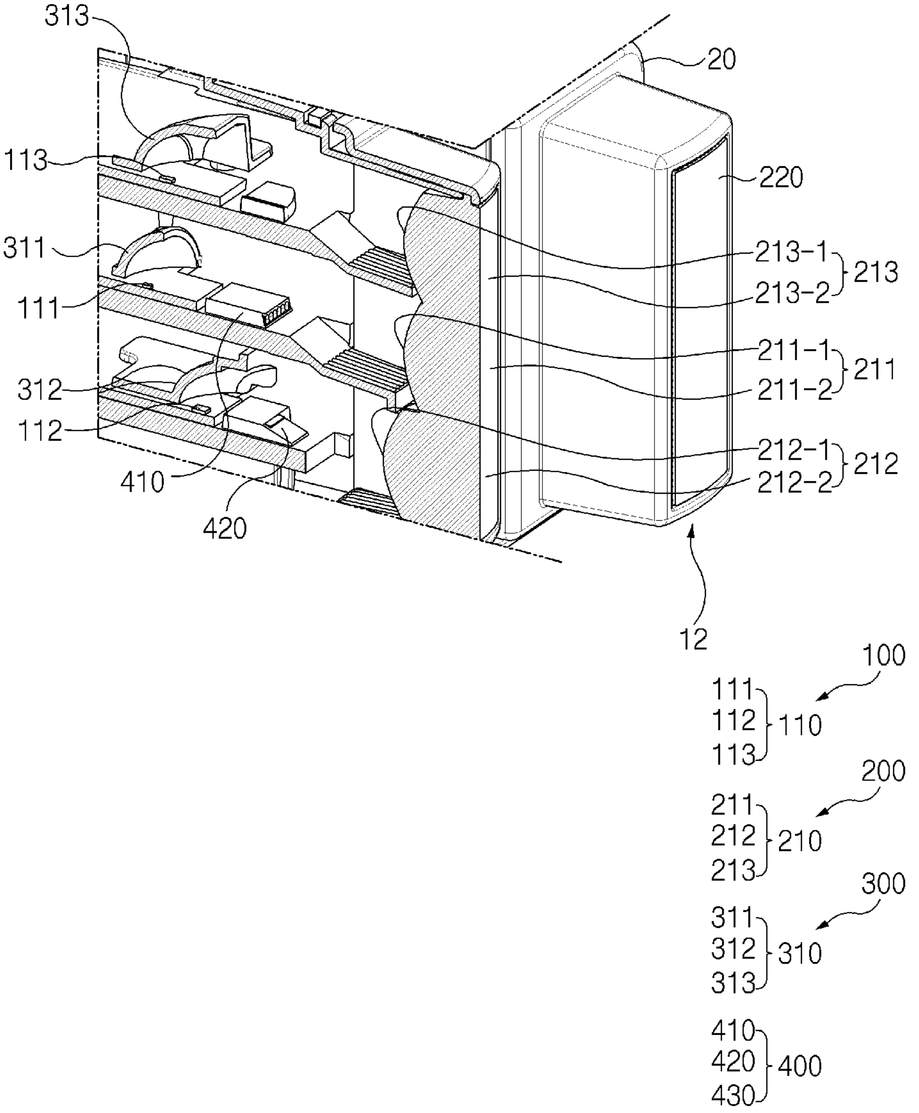
FIG. 2 is a cross-sectional perspective view of the lamp according to the first embodiment of the present disclosure.
Figure 3:
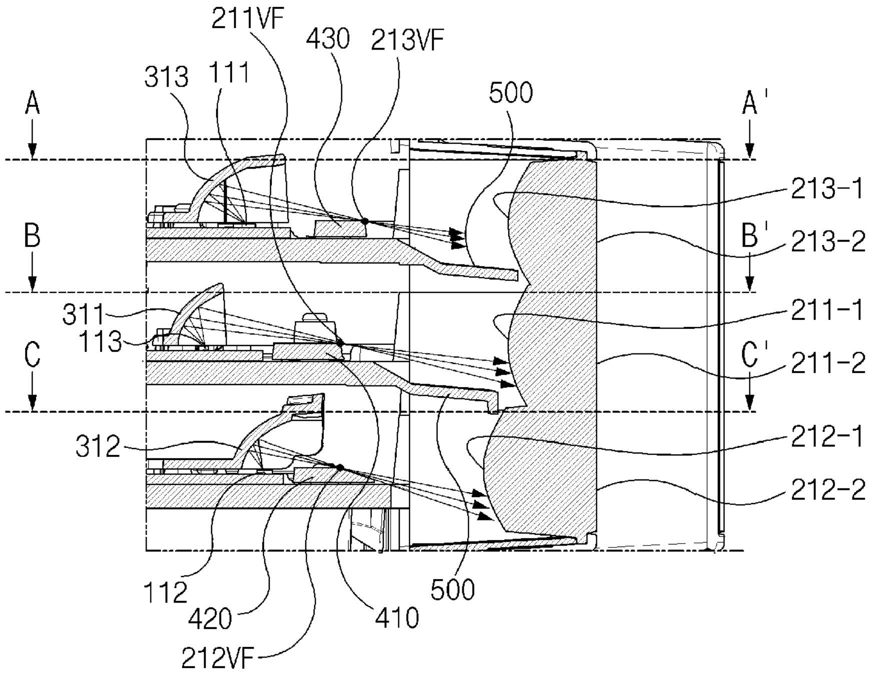
FIG. 3 is a longitudinal cross-sectional view of a first light emitting module according to the first embodiment of the present disclosure.
Figure 4:
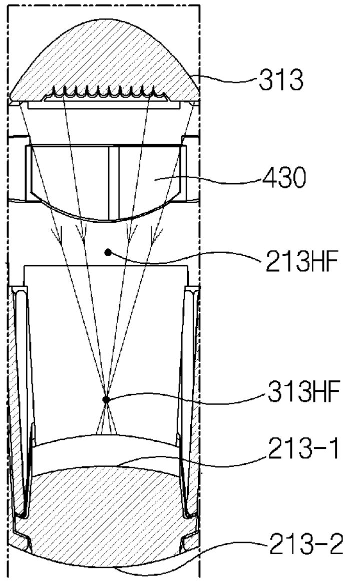
FIG. 4 is a transverse cross-sectional view along line A-A' of FIG. 3.

Referring to FIGS. 2 and 3, the low beam light source 110 may emit a light beam for forming the low beam light distribution pattern. The low beam light source 110 may include a first low beam light source 111, a second low beam light source 112, and a third low beam light source 113. The first low beam light source 111 may emit a light beam input into a first low area 211, which will be described below. The first low beam light source 111 may emit a light beam toward a first low light collector 311, which will be described below.

Further, the second low beam light source 112 may emit a light beam input into a second low area 212, which will be described below. The second low beam light source 112 may emit a light beam toward a second low light collector 312, which will be described below. Further, the third low beam light source 113 may emit a light beam input into a third low area 213, which will be described below. The third low beam light source 113 may emit a light beam toward a third low light collector 313, which will be described below.

Further, referring back to FIGS. 7 and 8, the light source 100 may further include a high beam light source 120 provided in the high beam light emitting module 12. A first high beam light source 121 may emit a light beam input into a first high area 221, which will be described below. The first high beam light source 121 may emit a light beam toward a first high light collector 321, which will be described below.

Further, a second high beam light source 122 may emit a light beam input into a second high area 222, which will be described below. The second high beam light source 122 may emit a light beam toward a second high light collector 322, which will be described below. Further, a third high beam light source 123 may emit a light beam input into a third high area 223, which will be described below. The third high beam light source 123 may emit a light beam toward a third high light collector 323, which will be described below.

The light beam output from the light source 100 is input into, passes through, and is then output from the lens 200. For example, the light beam output from the light source 100 reaches the light collector 300, is collected by the light collector 300, and is then input into the lens 200. The light beam for forming the light distribution pattern may be output from the lens 200. The lens 200 may extend in a vertical direction. The vertical direction may be defined as a direction perpendicular to the ground. Further, a horizontal direction may be defined as a direction perpendicular to the vertical direction. Further, a forward direction may be defined as a direction in which the light beam is input into the lens 200, and a rearward direction may be defined as a direction opposite to the forward direction. Further, a left-right direction may be defined as a direction perpendicular to the front-rear direction and the vertical direction. That is, the front-rear direction and the left-right direction may be understood as concepts included in the horizontal direction.

The lens 200 may include a low beam lens 210 provided in the low beam light emitting module 11 and a high beam lens 220 provided in the high beam light emitting module 12. The low beam lens 210 and the high beam lens 220 may include first areas 211 and 221, second areas 212 and 222, and third areas 213 and 223, respectively.

The first areas 211 and 221 may be defined as portions of the lens 200 from which a light beam for forming a first light distribution pattern is output. The first light distribution pattern may be defined as a central portion of the light distribution pattern and may form a hot zone of the light distribution pattern. The first areas 211 and 221 may include the first low area 211. The first low area 211 may be provided in the low beam lens 210.

Figure 5:
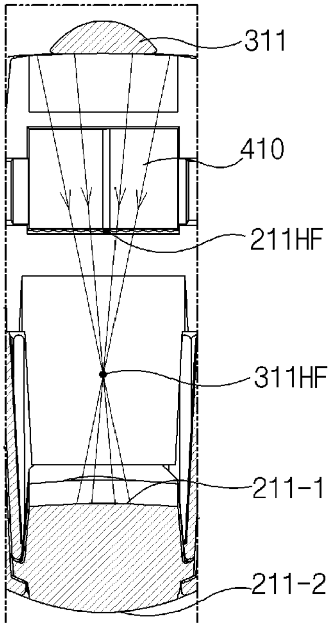
FIG. 5 is a transverse cross-sectional view along line B-B' of FIG. 3.
Figure 6:
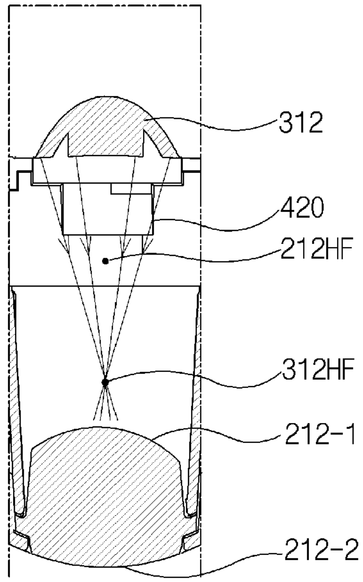
FIG. 6 is a transverse cross-sectional view along line C-C' of FIG. 3.
Figure 7:
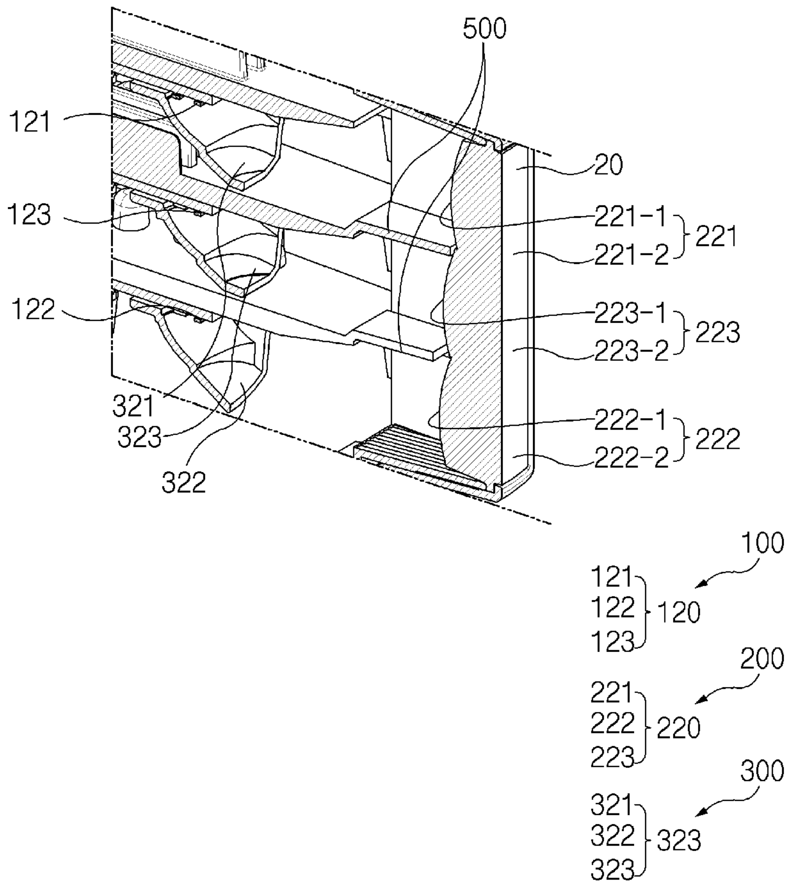
FIG. 7 is a cross-sectional perspective view of the lamp according to the first embodiment of the present disclosure.
Figure 8:
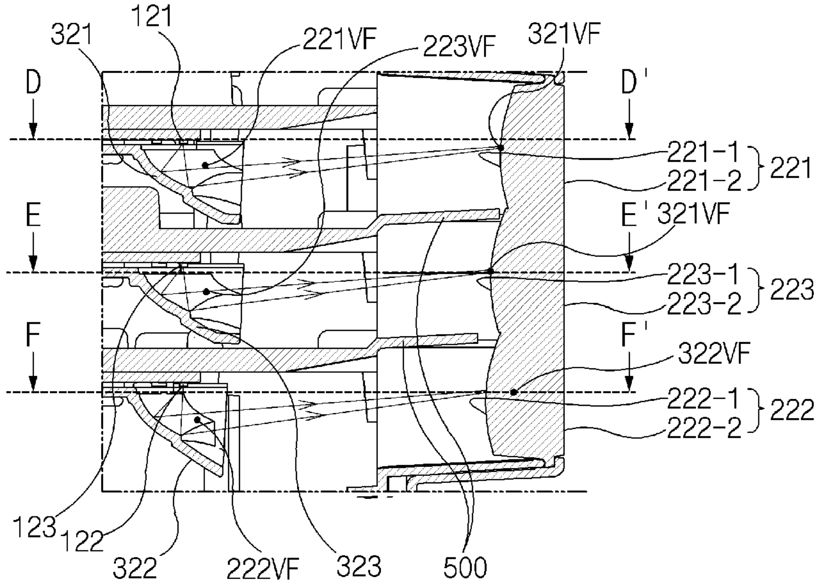
FIG. 8 is a longitudinal cross-sectional view of a second light emitting module according to the first embodiment of the present disclosure.
Figure 9:
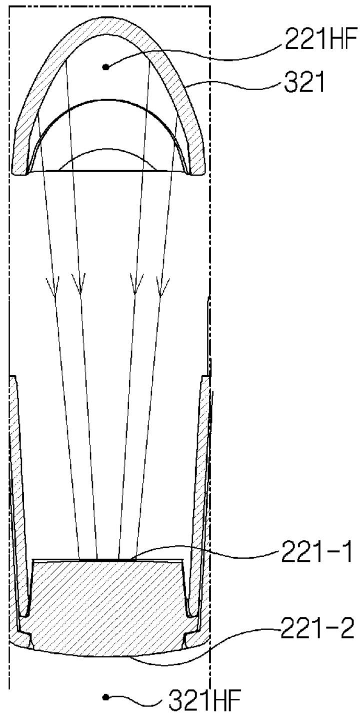
FIG. 9 is a transverse cross-sectional view along line D-D' of FIG. 8.
Figure 10:
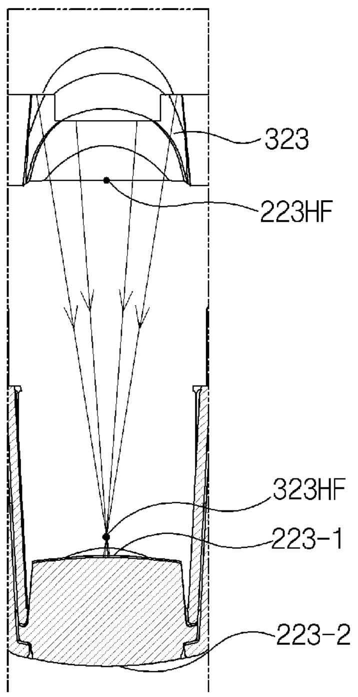
FIG. 10 is a transverse cross-sectional view along line E-E' of FIG. 8.
Figure 11:
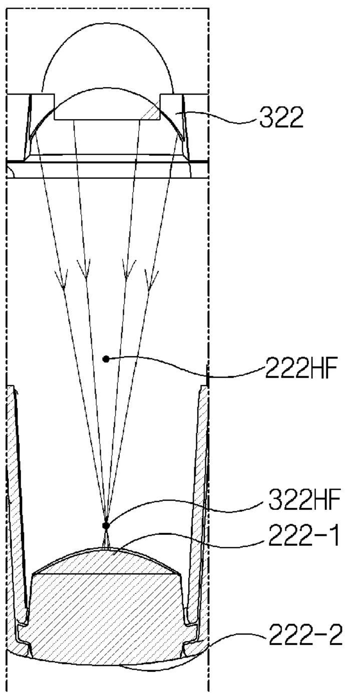
FIG. 11 is a transverse cross-sectional view along line F-F' of FIG. 8.
Figure 12:
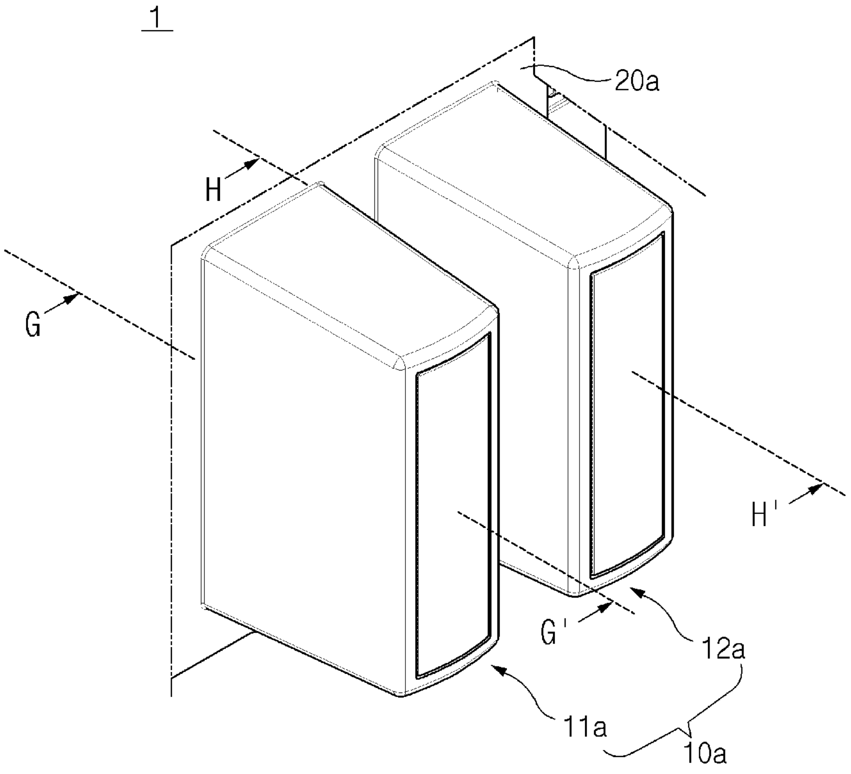
FIG. 12 is a perspective view of a lamp according to a second embodiment of the present disclosure.

Referring back to FIGS. 3 to 5, a first low beam light distribution pattern for forming a central portion of the low beam light distribution pattern may be output from the first low area 211. The first low beam light distribution pattern may be defined as a central portion of the low beam light distribution pattern and may form a hot zone of the low beam light distribution pattern. Referring to FIGS. 3 and 5, a first low vertical focus 211VF that is a vertical focus of the first low area 211 and a first low horizontal focus 211HF that is a horizontal focus of the first low area 211 may correspond to each other. Meanwhile, the fact that the first low vertical focus 211VF and the first low horizontal focus 211HF correspond to each other may be understood as concepts including a case in which positions of the first low vertical focus 211VF and the first low horizontal focus 211HF in a front-rear direction "L" and an up-down direction "H" are the same as well as a case in which, when viewed by those skilled in the art to which the present disclosure pertains, positions of the first low vertical focus 211VF and the first low horizontal focus 211HF in the front-rear direction "L" and the up-down direction "H" are different from each other but close to each other, which may achieve substantially the same effect as compared to a case in which the positions of the first low vertical focus 211VF and the first low horizontal focus 211HF in the front-rear direction "L" and the up-down direction "H" are the same. The concept of correspondence may be similarly understood in a relationship between the following different components.

The first low area 211 may include a first low light input surface 211-1 and a first low light output surface 211-2. The first low light input surface 211-1 may be defined as a portion of the first low area 211 into which a light beam is input. The first low light input surface 211-1 may have a rearward convex shape. A curvature of the first low light input surface 211-1 in the horizontal direction may be smaller than a curvature of the first low light input surface 211-1 in the vertical direction. In other words, a degree to which the first low light input surface 211-1 is convex in the horizontal direction may be smaller than a degree to which the first low light input surface 211-1 is convex in the vertical direction.

The first low light output surface 211-2 may be defined as a portion of the first low area 211, through which the light beam passing through the first low area 211 is output. When viewed from above, the first low light output surface 211-2 may have a rearward convex shape. In other words, the first low light output surface 211-2 may have a curvature in the horizontal direction. The curvature of the first low light output surface 211-2 in the horizontal direction may be greater than the curvature of the first low light input surface 211-1 in the horizontal direction. Further, when viewed from the side, the first low light output surface 211-2 may have a flat shape. In other words, the first low light output surface 211-2 may extend in the vertical direction without curvature.

The second areas 212 and 222 may be defined as portions of the lens 200 from which a light beam for forming a second light distribution pattern is output. The second light distribution pattern may be defined as a peripheral portion of the light distribution pattern and may form a wide zone of the light distribution pattern.

Further, a second diffusion angle that is a left-right directional diffusion angle of a light output from the second areas 212 and 222 may be greater than a first diffusion angle that is a left-right directional diffusion angle of the light output from the first areas 211 and 221. The first diffusion angle may be defined as an angle between a leftmost light beam and a rightmost light beam among bundles of light beams output from the first areas 211 and 221 when the lamp 1 is viewed from the upper side. Further, the second diffusion angle may be defined as an angle between a leftmost light beam and a rightmost light beam among bundles of light beams output from the second areas 212 and 222 when the lamp 1 is viewed from the upper side. In other words, a degree to which the light beams output from the second areas 212 and 222 are spread in the left-right direction may be greater than a degree to which the light beams output from the first areas 211 and 221 are spread in the left-right direction. In this way, since the second diffusion angle is greater than the first diffusion angle, the second light distribution pattern may have lower illuminance than that of the first light distribution pattern.

The second areas 212 and 222 may include the second low area 212. The second low area 212 may be provided in the low beam lens 210.

Referring back to FIGS. 3 and 6, a position in which a second low vertical focus 212VF that is a vertical focus of the second low area 212 is formed and a position in which a second low horizontal focus 212HF that is a horizontal focus of the second low area 212 is formed may be different from each other. For example, the second low horizontal focus 212HF may be positioned in front of the second low vertical focus 212VF. In other words, a second horizontal focal distance that is a separation distance between the second low horizontal focus 212HF and the second low area 212 in the front-rear direction may be smaller than a second vertical focal distance that is a separation distance between the second low vertical focus 212VF and the second low area 212 in the front-rear direction.

Further, the second horizontal focal distance may be smaller than a first horizontal focal distance that is a separation distance between the first low horizontal focus 211HF and the first low area 211 in the front-rear direction. In this way, since the second horizontal focal distance is smaller than the first horizontal focal distance, the second diffusion angle may be greater than the first diffusion angle.

The second low area 212 may include a second low light input surface 212-1 and a second low light output surface 212-2. The second low light input surface 212-1 may be defined as a portion of the second low area 212 into which a light beam is input. The second low light input surface 212-1 may have a rearward convex shape. The curvature of the second low light input surface 212-1 in the horizontal direction may be greater than the curvature of the first low light input surface 211-1 in the horizontal direction. In other words, a degree to which the second low light input surface 212-1 is convex in the horizontal direction may be greater than a degree of which the first low light input surface 211-1 is convex in the horizontal direction.

The second low light output surface 212-2 may be defined as a portion of the second low area 212, through which the light beam passing through the second low area 212 is output. When viewed from above, the second low light output surface 212-2 may have a rearward convex shape. In other words, the second low light output surface 212-2 may have a curvature in the horizontal direction. The curvature of the second low light output surface 212-2 in the horizontal direction may be smaller than the curvature of the second low light input surface 212-1 in the horizontal direction. Further, when viewed from the side, the second low light output surface 212-2 may have a flat shape. In other words, the second low light output surface 212-2 may extend in the vertical direction without curvature. The second low light output surface 212-2 may extend downward from a lower end of the first low light output surface 211-2. For example, the second low light output surface 212-2 and the first low light output surface 211-2 may have a smoothly connected shape without a notch.

The third areas 213 and 223 may be defined as portions of the lens 200 from which alight beam for forming a third light distribution pattern is output. The third light distribution pattern may be formed between the first light distribution pattern and the second light distribution pattern. The third light distribution pattern may form a sub hot zone of the light distribution pattern.

A third diffusion angle that is a diffusion angle of the light beam output from the third areas 213 and 223 in the left-right direction may be greater than the first diffusion angle and smaller than the second diffusion angle. The third diffusion angle may be defined as an angle between a leftmost light beam and a rightmost light beam among bundles of light beams output from the third areas 213 and 223 when the lamp 1 is viewed from the upper side. Since the third diffusion angle is greater than the first diffusion angle and smaller than the second diffusion angle, the third light distribution pattern has an illuminance that is smaller than that of the first light distribution pattern and greater than that of the second light distribution pattern.

The third areas 213 and 223 may include the third low area 213. The third low area 213 may be provided in the low beam lens 210.

Referring back to FIGS. 3 and 4, a position in which a third low vertical focus 213VF that is a vertical focus of the third low area 213 is formed and a position in which a third low horizontal focus 213HF that is a horizontal focus of the third low area 213 is formed may be different from each other. For example, the third low horizontal focus 213HF may be positioned in front of the third low vertical focus 213VF. In other words, a third horizontal focal distance that is a separation distance between the third low horizontal focus 213HF and the third low area 213 in the front-rear direction may be smaller than a third vertical focal distance that is a separation distance between the third low vertical focus 213VF and the third low area 213 in the front-rear direction.

Further, the third horizontal focal distance may be smaller than the first horizontal focal distance and greater than the second horizontal focal distance. In this way, since the third horizontal focal distance is smaller than the first horizontal focal distance and greater than the second horizontal focal distance, the third diffusion angle may be greater than the first diffusion angle and smaller than the second diffusion angle.

The third low area 213 may include a third low light input surface 213-1 and a third low light output surface 213-2. The third low light input surface 213-1 may be defined as a portion of the third low area 213 into which a light beam is input. The third low light input surface 213-1 may have a rearward convex shape. A curvature of the third low light input surface 213-1 in the horizontal direction may be greater than the curvature of the first low light input surface 211-1 in the horizontal direction and smaller than the curvature of the second low light input surface 212-1 in the horizontal direction. In other words, a degree to which the third low light input surface 213-1 is convex in the horizontal direction may be greater than the degree to which the first low light input surface 211-1 is convex in the horizontal direction and smaller than the degree to which the second low light input surface 212-1 is convex in the horizontal direction.

The third low light output surface 213-2 may be defined as a portion of the third low area 213, through which the light beam passing through the third low area 213 is output. When viewed from above, the third low light output surface 213-2 may have a rearward convex shape. In other words, the third low light output surface 213-2 may have a curvature in the horizontal direction. Further, when viewed from the side, the third low light output surface 213-2 may have a flat shape. In other words, the third low light output surface 213-2 may extend in the vertical direction without curvature. The third low light output surface 213-2 may extend upward from an upper end of the first low light output surface 211-2. For example, the third low light output surface 213-2 and the first low light output surface 211-2 may have a smoothly connected shape without a notch. In other words, the first low light output surface 211-2, the second low light output surface 212-2, and the third low light output surface 213-2 may have a smoothly connected shape without a notch. Further, as an example, the first low area 211, the second low area 212, and the third low area 213 may be integrally formed. Further, a width of the first low area 211 in the front-rear direction may be smaller than a width of the second low area 212 in the front-rear direction and greater than a width of the third low area 213 in the front-rear direction.

The first areas 211 and 221 may further include the first high area 221. The first high area 221 may be provided in the high beam lens 220.

Referring back to FIGS. 8 and 9, a first high beam light distribution pattern for forming a central portion of the high beam light distribution pattern may be output from the first high area 221. The first high beam light distribution pattern may form a hot zone of the high beam light distribution pattern. A first high vertical focus 221VF that is a vertical focus of the first high area 221 and a first high horizontal focus 221HF that is a horizontal focus of the first high area 221 may correspond to each other. The first high area 221 may include a first high light input surface 221-1 and a first high light output surface 221-2.

The first high light input surface 221-1 may be defined as a portion of the first high area 221 into which a light beam is input. The first high light input surface 221-1 may have a rearward convex shape. A curvature of the first high light input surface 221-1 in the horizontal direction may be smaller than a curvature of the first high light input surface 221-1 in the vertical direction. In other words, a degree to which the first high light input surface 221-1 is convex in the horizontal direction may be smaller than a degree to which the first high light input surface 221-1 is convex in the vertical direction.

The first high light output surface 221-2 may be defined as a portion of the first high area 221, through which the light beam passing through the first high area 221 is output. When viewed from above, the first high light output surface 221-2 may have a rearward convex shape. In other words, the first high light output surface 221-2 may have a curvature in the horizontal direction. The curvature of the first high light output surface 221-2 in the horizontal direction may be greater than the curvature of the first high light input surface 221-1 in the horizontal direction. Further, when viewed from the side, the first high light output surface 221-2 may have a flat shape. In other words, the first high light output surface 221-2 may extend in the vertical direction without curvature.

Further, the second areas 212 and 222 may further include the second high area 222. The second high area 222 may be provided in the high beam lens 220. Referring back to FIGS. 8 and 11, a second high beam light distribution pattern for forming a peripheral portion of the high beam light distribution pattern may be output from the second high area 222. The second high beam light distribution pattern may form a wide zone of the high beam light distribution pattern.

A position of a second high vertical focus 222VF that is a vertical focus of the second high area 222 and a position of a second high horizontal focus 222HF that is a horizontal focus of the second high area 222 may be different from each other. For example, the second high horizontal focus 222HF may be positioned in front of the second high vertical focus 222VF. In other words, a separation distance between the second high horizontal focus 222HF and the second high area 222 in the front-rear direction may be smaller than a separation distance between the second high vertical focus 222VF and the second high area 222 in the front-rear direction. The second high area 222 may include a second high light input surface 222-1 and a second high light output surface 222-2.

The second high light input surface 222-1 may be defined as a portion of the second high area 222 into which a light beam is input. The second high light input surface 222-1 may have a rearward convex shape. The second high light output surface 222-2 may be defined as a portion of the second high area 222, through which the light beam passing through the second high area 222 is output. When viewed from above, the second high light output surface 222-2 may have a rearward convex shape. In other words, the second high light output surface 222-2 may have a curvature in the horizontal direction. The curvature of the second high light output surface 222-2 in the horizontal direction may be smaller than the curvature of the second high light input surface 222-1 in the horizontal direction. Further, when viewed from the side, the second high light output surface 222-2 may have a flat shape. In other words, the second high light output surface 222-2 may extend in the vertical direction without curvature.

The third areas 213 and 223 may further include the third high area 223. The third high area 223 may be provided in the high beam lens 220. Referring back to FIGS. 8 and 10, the third high area 223 may output a third high beam light distribution pattern formed between the first high beam light distribution pattern and the second high beam light distribution pattern. The third high beam light distribution pattern may form a sub hot zone of the high beam light distribution pattern.

A position of a third high vertical focus 223VF that is a vertical focus of the third high area 223 and a position of a third high horizontal focus 223HF that is a horizontal focus of the third high area 223 may be different from each other. For example, the third high horizontal focus 223HF may be positioned in front of the third high vertical focus 223VF. In other words, a separation distance between the third high horizontal focus 223HF and the third high area 223 in the front-rear direction may be smaller than a separation distance between the third high vertical focus 223VF and the third high area 223 in the front-rear direction. The third high area 223 may include a third high light input surface 223-1 and a third high light output surface 223-2.

The third high light input surface 223-1 may be defined as a portion of the third high area 223 into which a light beam is input. The third high light input surface 223-1 may have a rearward convex shape. A curvature of the third high light input surface 223-1 in the horizontal direction may be smaller than a curvature of the third high light input surface 223-1 in the vertical direction.

Further, when the high beam light emitting module 12 is provided as the IFS, the first high area 221 may be disposed between the second high area 222 and the third high area 223. Further, when the high beam light emitting module 12 is provided as the IFS, at least some of horizontal focuses of the first high area 221, the second high area 222, and the third high area 223 may be positioned to be spaced apart from each other in the left-right direction. For example, the horizontal focus of the first high area 221 may pass through a center of the first high light input surface 221-1 and may be positioned on a virtual plane perpendicular to the left-right direction. In this case, the horizontal focus of the second high area 222 may be disposed on a left side of the horizontal focus of the first high area 221. Further, the horizontal focus of the third high area 223 may be disposed on a left side of the horizontal focus of the second high area 222.

Further, when the high beam light emitting module 12 is provided as the IFS, at least one of the first high light input surface 221-1, the second high light input surface 222-1, and the third high light input surface 223-1 may have an asymmetrical shape in the left-right direction.

Further, when the high beam light emitting module 12 is provided as the IFS, each of the first high beam light source 121, the second high beam light source 122, and the third high beam light source 123 may be provided in plurality.

The third high light output surface 223-2 may be defined as a portion of the third high area 223, through which the light beam passing through the third high area 223 is output. When viewed from above, the third high light output surface 223-2 may have a rearward convex shape. In other words, the third high light output surface 223-2 may have a curvature in the horizontal direction. Further, when viewed from the side, the third high light output surface 223-2 may have a flat shape. In other words, the third high light output surface 223-2 may extend in the vertical direction without curvature.

The light collector 300 may collect the light beam output from the light source 100. The light collector 300 may be, for example, a reflector. However, the spirit of the present disclosure is not limited thereto, and the light collector 300 may be provided in various units, which may collect the light beam, such as a silicon rod optic, a collimator, and a total internal reflection (TIR) lens. An optical path of the light beam output from the light source 100 may be controlled according to a shape in which the light collector 300 is manufactured. For example, when the light collector 300 is a reflector, the optical path of the light beam may be controlled by tilting or descending a reflective surface of the reflector.

A horizontal focus of the light collector 300 and a vertical focus of the light collector 300 may be the same or may be different from each other. For example, when the light collector 300 is a reflector, a position of the horizontal focus of the light collector 300 may be determined based on a curvature of the reflective surface of the reflector in the horizontal direction. Further, a position of the vertical focus of the light collector 300 may be determined based on a curvature of the reflective surface of the reflector in the vertical direction.

The light collector 300 may include a low light collector 310 provided in the low beam light emitting module 11. The low light collector 310 may reflect the light beam output from the low beam light source 110 so that the light beam output from the low beam light source 110 is directed toward the low beam lens 210. The low light collector 310 may include the first low light collector 311, the second low light collector 312, and the third low light collector 313.

The first low light collector 311 may reflect the light beam output form the first low beam light source 111. Further, referring back to FIG. 3, a vertical focus of the first low light collector 311 may correspond to the first low vertical focus 211VF. Further, referring back to FIG. 5, a position of a horizontal focus 311HF of the first low light collector 311 may be different from a position of the first low horizontal focus 211HF. For example, the horizontal focus 311HF of the first low light collector 311 may be positioned in front of the first low horizontal focus 211HF.

The second low light collector 312 may reflect the light beam output form the second low beam light source 112. Referring back to FIG. 3, a vertical focus of the second low light collector 312 may correspond to a second low vertical focus 211VF However, the present disclosure is not limited to these examples, and the vertical focus of the second low light collector 312 may be positioned in front of the second low vertical focus 211VF. Further, referring back to FIG. 6, a position of a horizontal focus 312HF of the second low light collector 312 may be different from a position of the second low horizontal focus 212HF. For example, the horizontal focus 312HF of the second low light collector 312 may be positioned in front of the second low horizontal focus 212HF.

The third low light collector 313 may reflect the light beam output form the third low beam light source 113. Referring back to FIG. 3, a vertical focus of the third low light collector 313 may correspond to the third low vertical focus 213VF. Further, referring back to FIG. 4, a position of a horizontal focus 313HF of the third low light collector 313 may be different from a position of the third low horizontal focus 213HF. For example, the horizontal focus 313HF of the third low light collector 313 may be positioned in front of the third low horizontal focus 213HF.

Further, the light collector 300 may further include a high light collector 320 provided in the high beam light emitting module 12. The high light collector 320 may reflect the light beam output from the high beam light source 120 so that the light beam output from the high beam light source 120 is directed toward the high beam lens 220. The high light collector 320 may include the first high light collector 321, the second high light collector 322, and the third high light collector 323.

The first high light collector 321 may reflect the light beam output form the first high beam light source 121. Further, referring back to FIG. 8, a vertical focus 321VF of the first high light collector 321 may be positioned in front of the first high vertical focus 221VF. Further, referring back to FIG. 9, a position of a horizontal focus 321HF of the first high light collector 321 may be different from a position of the first high horizontal focus 221HF. For example, the horizontal focus 321HF of the first high light collector 321 may be positioned in front of the first high horizontal focus 221HF. In more detail, the horizontal focus 321HF of the first high light collector 321 may be positioned in front of the first high area 221.

The second high light collector 322 may reflect the light beam output form the second high beam light source 122. Referring back to FIG. 8, a vertical focus 322VF of the second high light collector 322 may be positioned in front of the second high vertical focus 222VF. Further, referring back to FIG. 11, a position of a horizontal focus 322HF of the second high light collector 322 may be different from a position of the second high horizontal focus 222HF. For example, the horizontal focus 322HF of the second high light collector 322 may be positioned in front of the second high horizontal focus 222HF.

The third high light collector 323 may reflect the light beam output form the third high beam light source 123. Referring back to FIG. 8, a vertical focus 323VF of the third high light collector 323 may be positioned in front of the third high vertical focus 223VF. Further, referring back to FIG. 10, a position of a horizontal focus 323HF of the third high light collector 323 may be different from a position of the third high horizontal focus 223HF. For example, the horizontal focus 323HF of the third high light collector 323 may be positioned in front of the third high horizontal focus 223HF.

Referring back to FIG. 2, the shield 400 may block a portion of the light beam reflected by the light collector 300 so that only a portion of the light beam collected in the light collector 300 is input to the lens 200. Through the shield 400, the light beam output from the lens 200 may form the low beam light distribution pattern that satisfies the law. The shield 400 may be provided in the low beam light emitting module 11. The shield 400 may include a first shield 410, a second shield 420, and a third shield 430.

The first shield 410 may block a portion of the light beam reflected by the first low light collector 311 so that another portion of the light beam forms the first low beam light distribution pattern. A step for forming a cutoff of the first low beam light distribution pattern may be formed in a center of the first shield 410. The step of the first shield 410 may extend in the front-rear direction. Further, a front end of the first shield 410 may extend in the left-right direction.

The second shield 420 may block a portion of the light beam reflected by the second low light collector 312 so that another portion of the light beam forms a second low beam light distribution pattern. A front side of the second shield 420 may have a shape of which a height decreases toward the front. In other words, an inclined surface may be provided on the front side of the second shield 420.

The third shield 430 may block a portion of the light beam reflected by the third low light collector 313 so that another portion of the light beam forms a third low beam light distribution pattern. A step for forming a cutoff of the third low beam light distribution pattern may be formed in a center of the third shield 430. A front side of the third shield 430 may have a forward convex shape.

The partition wall 500 may prevent the light beams output from two adjacent light sources 100 among the plurality of light sources 100 from interfering with each other. The partition wall 500 may be disposed between the two adjacent light sources 100 among the plurality of light sources 100. The partition wall 500 may be provided as a plurality of partition walls 500. The plurality of partition walls 500 may be provided in the low beam light emitting module 11. The plurality of partition walls 500 and the plurality of low beam light sources 111, 112, and 113 provided in the low beam light emitting module 11 may be alternately arranged in the vertical direction.

Further, the plurality of partition walls 500 may be provided in the high beam light emitting module 12. The plurality of partition walls 500 and the plurality of high beam light sources 121, 122, and 123 provided in the high beam light emitting module 12 may be alternately arranged in the vertical direction.

The lamp body 20 may support the low beam light emitting module 11 and the high beam light emitting module 12. The lamp body 20 may be fixed to a frame of the vehicle.

Hereinafter, the lamp 1 according to a second embodiment of the present disclosure will be described with reference to FIGS. 12 to 18. When describing the lamp 1 according to the second embodiment, a difference between the first embodiment and the second embodiment of the present disclosure will be mainly described. The lamp 1 may include a light emitting module 10*a* and a lamp body 20*a*.

The light emitting module 10*a* may include a first light emitting module 11*a* and a second light emitting module 12*a* spaced apart from each other in the left-right direction. A light beam for forming at least one of a low beam light distribution pattern, a high beam light distribution pattern, or a combination thereof may be output from the first light emitting module 11*a*. The first light emitting module 11*a* may include a (1-1)th low beam light source 111*a*-1, a (2-1)th low beam light source 112*a*-1, a (1-1)th high beam light source 121*a*-1, a (2-1)th high beam light source 122*a*-1, a (1-1)th low area 211*a*-1, a (2-1)th low area 212*a*-1, a (1-1)th high area 221*a*-1, a (2-1)th high area 222*a*-1, a (1-1)th low light collector 311*a*-1, a (2-1)th low light collector 312*a*-1, a (1-1)th high light collector 321*a*-1, a (2-1)th high light collector 322*a*-1, a (1-1)th shield 411, and a (2-1)th shield 421.

The light beam output from the (1-1)th low beam light source 111*a*-1 may be collected by the (1-1)th low light collector 311*a*-1. The light beam output from the (2-1)th low beam light source 112*a*-1 may be collected by the (2-1)th low light collector 312*a*-1. The light beam output from the (1-1)th high beam light source 121*a*-1 may be collected by the (1-1)th high light collector 321*a*-1. The light beam output from the (2-1)th high beam light source 122*a*-1 may be collected by the (2-1)th high light collector 322*a*-1.

Figure 13:
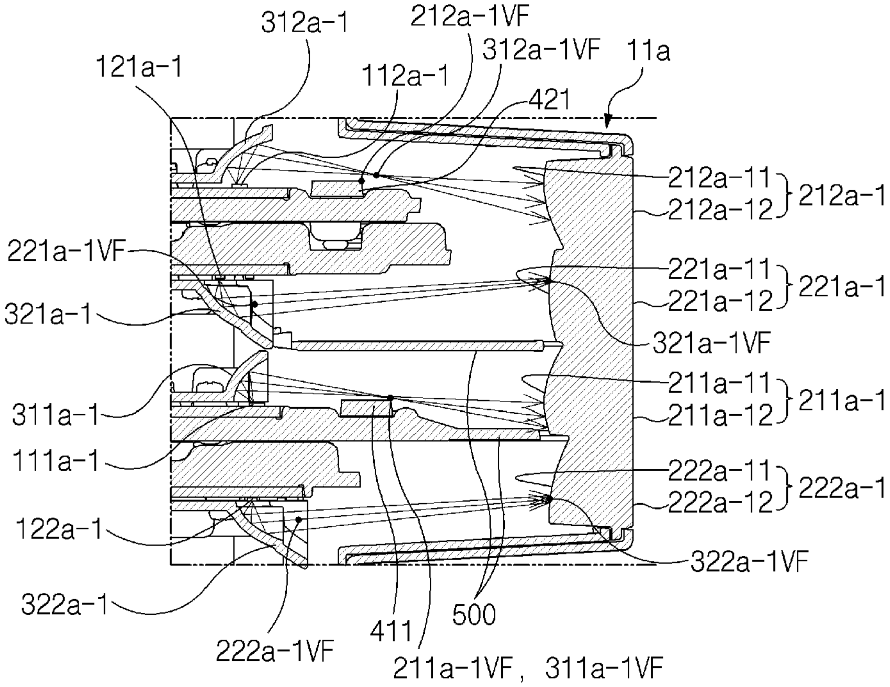
FIG. 13 is a longitudinal cross-sectional view along line G-G' of FIG. 12.

Referring to FIG. 13, the light beam output from the (1-1)th low area 211*a*-1 may form a central portion of the low beam light distribution pattern. A position of a (1-1)th low vertical focus 211*a*-1VF that is a vertical focus of the (1-1)th low area 211*a*-1 may correspond to a position of a (1-1)th low horizontal focus 211*a*-1HF that is a horizontal focus of the (1-1)th low area 211*a*-1.

Further, a vertical focus 311*a*-1VF of the (1-1)th low light collector 311*a*-1 may correspond to the (1-1)th low vertical focus 211*a*-1VF. Further, referring to FIG. 17, a horizontal focus 311*a*-1HF of the (1-1)th low light collector 311*a*-1 may correspond to the (1-1)th low horizontal focus 211*a*-1HF.

Referring back to FIG. 13, the light beam output from the (2-1)th low area 212*a*-1 may form a peripheral portion of the low beam light distribution pattern. A (2-1)th low vertical focus 212*a*-1VF that is a vertical focus of the (2-1)th low area 212*a*-1 may be positioned behind a (2-1)th low horizontal focus 212*a*-1HF that is a horizontal focus of the (2-1)th low area 212*a*-1. A curvature of a light input surface 212*a*-11 of the (2-1)th low area 212*a*-1 in the horizontal direction may be greater than a curvature of a light output surface 212*a*-12 of the (2-1)th low area 212*a*-1 in the horizontal direction. In other words, a degree to which the light input surface 212*a*-11 of the (2-1)th low area 212*a*-1 is rearward convex may be greater than a degree to which the light output surface 212*a*-12 of the (2-1)th low area 212*a*-1 is forward convex.

Further, a vertical focus of the (2-1)th low light collector 312*a*-1 may be positioned in front of the (2-1)th low vertical focus 212*a*-1VF. Further, referring to FIG. 15, a horizontal focus 312*a*-1HF of the (2-1)th low light collector 312*a*-1 may be positioned in front of the (2-1)th low horizontal focus 212*a*-1HF.

Referring back to FIG. 13, the light beam output from the (1-1)th high area 221*a*-1 may form a central portion of the high beam light distribution pattern. A position of a (1-1)th high vertical focus 221*a*-1VF that is a vertical focus of the (1-1)th high area 221*a*-1 may correspond to a position of a (1-1)th high horizontal focus 221*a*-1HF that is a horizontal focus of the (1-1)th high area 221*a*-1.

Further, a vertical focus 321*a*-1VF of the (1-1)th high light collector 321*a*-1 may be positioned in front of the (1-1)th high vertical focus 221*a*-1VF. Further, referring to FIG. 16, a horizontal focus 321*a*-1HF of the (1-1)th high light collector 321*a*-1 may be positioned in front of the (1-1)th high horizontal focus 221*a*-1HF.

Referring back to FIG. 13, the light beam output from the (2-1)th high area 222*a*-1 may form a peripheral portion of the high beam light distribution pattern. A (2-1)th high vertical focus 222*a*-1VF that is a vertical focus of the (2-1)th high area 222*a*-1 may be positioned behind a (2-1)th high horizontal focus 222*a*-1HF that is a horizontal focus of the (2-1)th high area 222*a*-1.

Further, a vertical focus 322*a*-1VF of the (2-1)th high light collector 322*a*-1 may be positioned in front of the (2-1)th high vertical focus 222*a*-1VF. Further, referring to FIG. 18, a horizontal focus 322*a*-1HF of the (2-1)th high light collector 322*a*-1 may be positioned in front of the (2-1)th high horizontal focus 222*a*-1HF.

Figure 15:
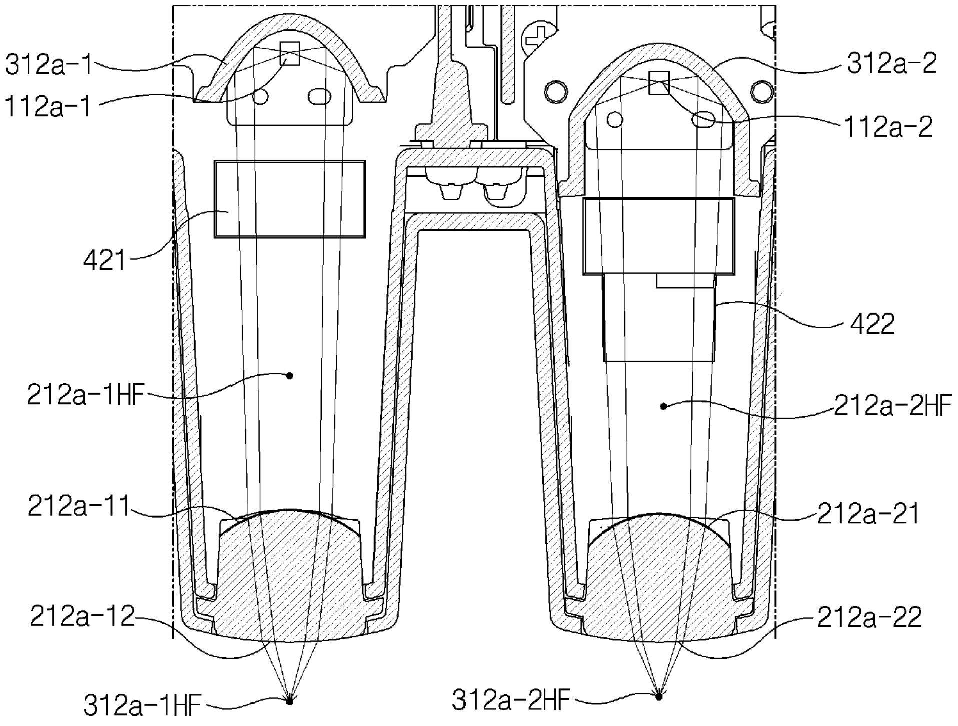
FIG. 15 is a transverse cross-sectional view along line I-' of FIG. 14.
Figure 16:
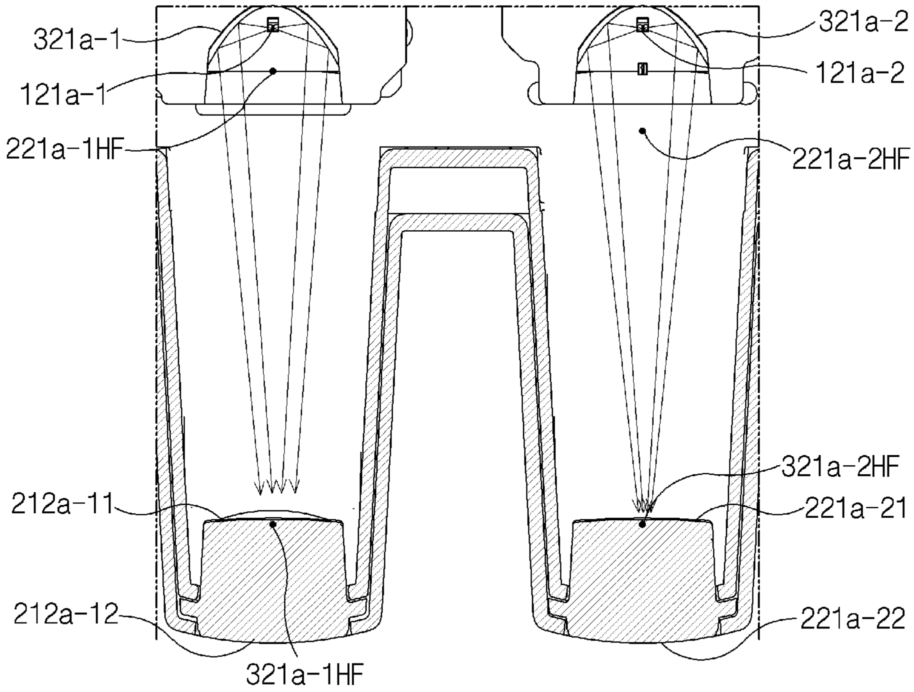
FIG. 16 is a transverse cross-sectional view along line J-J' of FIG. 14.
Figure 17:
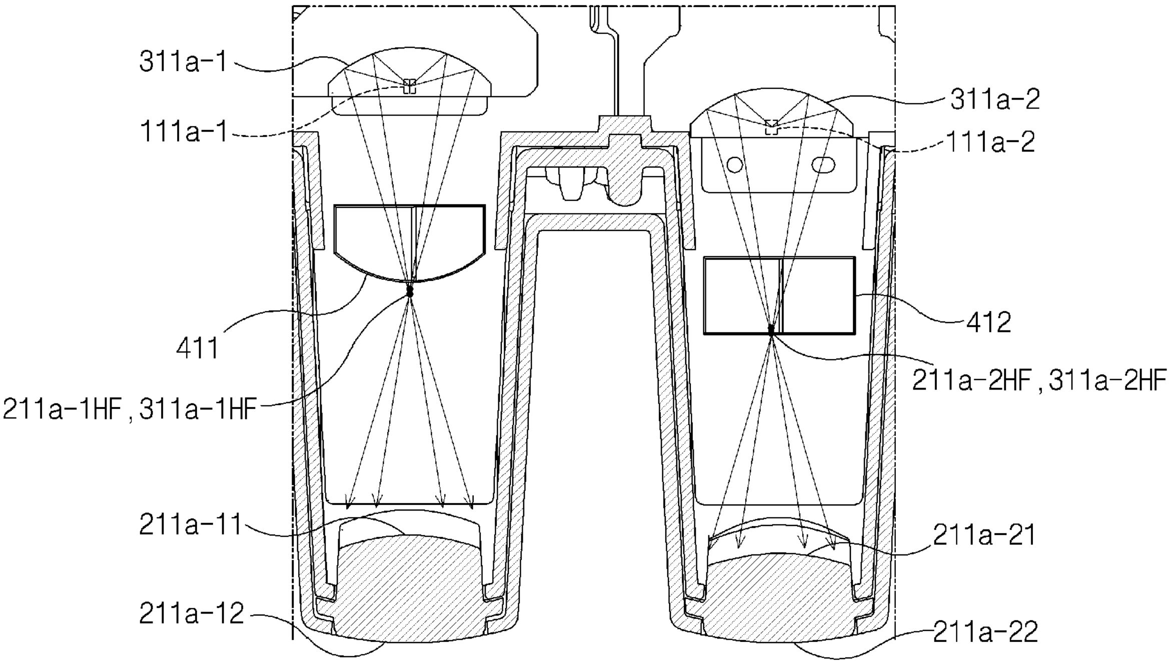
FIG. 17 is a transverse cross-sectional view along line K-K of FIG. 14.
Figure 18:
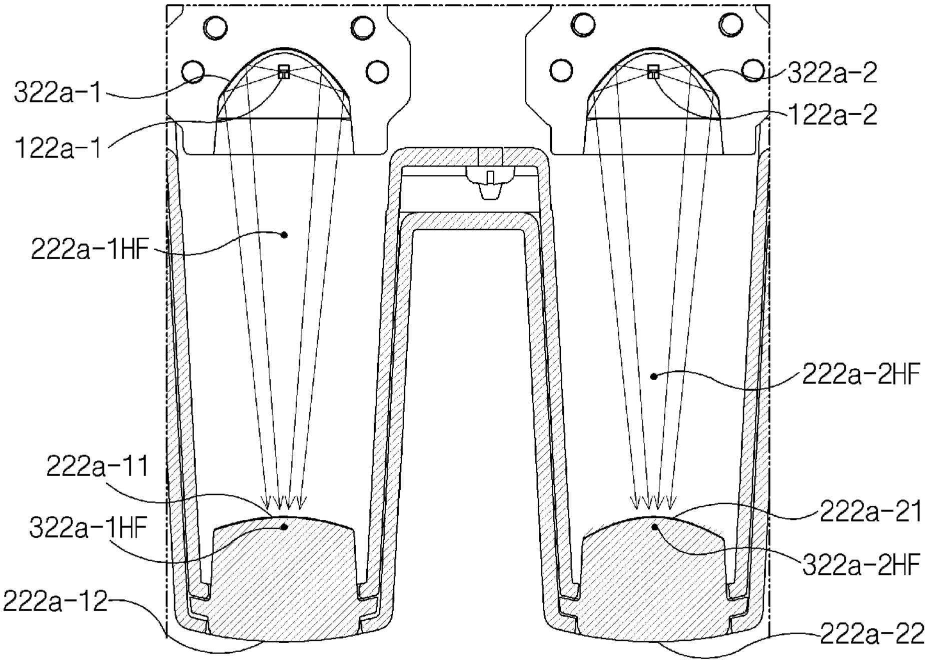
FIG. 18 is a transverse cross-sectional view along line L-L' of FIG. 14.

Referring to FIG. 17, the (1-1)th shield 411 may have a shape corresponding to the third shield 430 according to the first embodiment. Referring to FIG. 15, the (2-1)th shield 421 may have a flat shape with no step. A front end of the (2-1)th shield 421 may have a shape extending in the left-right direction.

Further, the (2-1)th low area 212*a*-1, the (1-1)th high area 221*a*-1, the (1-1)th low area 211*a*-1, and the (2-1)th high area 222*a*-1 may be sequentially arranged in the vertical direction. For example, among the (2-1)th low area 212*a*-1, the (1-1)th high area 221*a*-1, the (1-1)th low area 211*a*-1, and the (2-1)th high area 222*a*-1, the (2-1)th low area 212*a*-1 may be disposed on the uppermost side, and the (2-1)th high area 222*a*-1 may be disposed on the lowermost side.

Further, a light input surface 211*a*-11 of the (1-1)th low area 211*a*-1, the light input surface 212*a*-11 of the (2-1)th low area 212*a*-1, and a light input surface 222*a*-11 of the (2-1)th high area 222*a*-1 may each have an asymmetrical shape in the vertical direction. Further, a light input surface 221*a*-11 of the (1-1)th high area 221*a*-1 may have a symmetric shape in the vertical direction.

Further, the light output surface 212*a*-12 of the (2-1)th low area 212*a*-1, a light output surface 221*a*-12 of the (1-1)th high area 221*a*-1, a light output surface 211*a*-12 of the (1-1)th low area 211*a*-1, and a light output surface 222*a*-12 of the (2-1)th high area 222*a*-1 may have a shape sequentially connected in the vertical direction.

Figure 14:
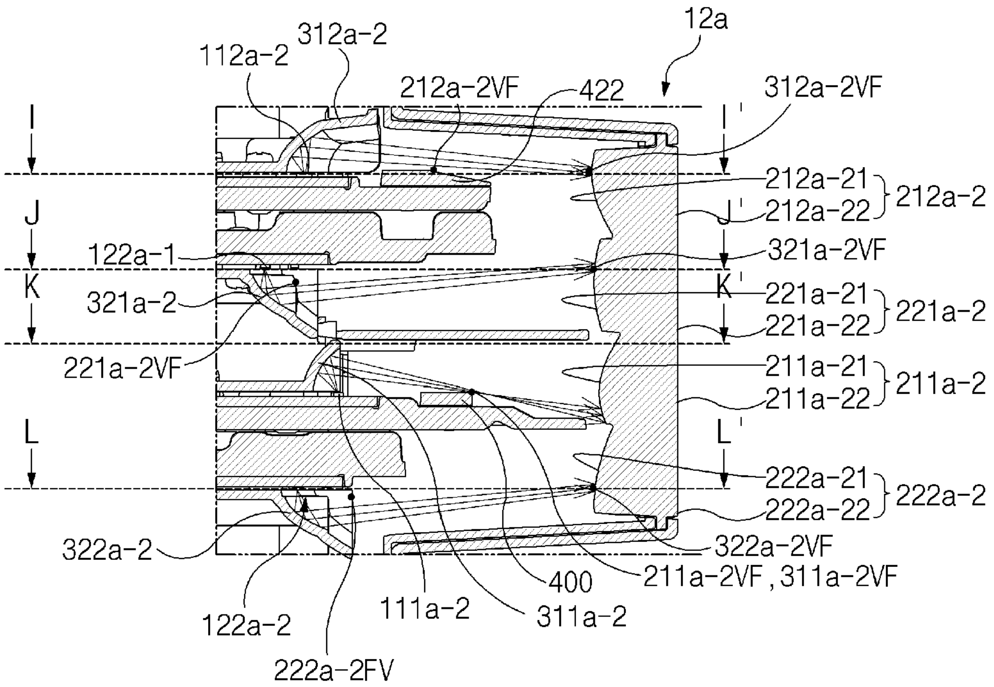
FIG. 14 is a longitudinal cross-sectional view along line H-H' of FIG. 12.

Referring to FIG. 14, the second light emitting module 12*a* may include a (1-2)th low beam light source 111*a*-2, a (2-2)th low beam light source 112*a*-2, a (1-2)th high beam light source 121*a*-2, a (2-2)th high beam light source 122*a*-2, a (1-2)th low area 211*a*-2, a (2-2)th low area 212*a*-2, a (1-2)th high area 221*a*-2, a (2-2)th high area 222*a*-2, a (1-2)th low light collector 311*a*-2, a (2-2)th low light collector 312*a*-2, a (1-2)th high light collector 321*a*-2, a (2-2)th high light collector 322*a*-2, a (1-2)th shield 412, and a (2-2)th shield 422.

The light beam output from the (1-2)th low beam light source 111*a*-2 may be collected by the (1-2)th low light collector 311*a*-2. The (1-2)th low beam light source 111*a*-2 may be disposed in front of the (1-1)th low beam light source 111*a*-1.

The light beam output from the (2-2)th low beam light source 112*a*-2 may be collected by the (2-2)th low light collector 312*a*-2. The (2-2)th low beam light source 112*a*-2 may be disposed in front of the (2-1)th low beam light source 112*a*-1.

The light beam output from the (1-2)th high beam light source 121*a*-2 may be collected by the (1-2)th high light collector 321*a*-2. The light beam output from the (2-2)th high beam light source 122*a*-2 may be collected by the (2-2)th high light collector 322*a*-2.

Referring back to FIG. 14, the light beam output from the (1-2)th low area 211*a*-2 may form a central portion of the low beam light distribution pattern. A position of a (1-2)th low vertical focus 211*a*-2VF that is a vertical focus of the (1-2)th low area 211*a*-2 may correspond to a position of a (1-2)th low horizontal focus 211*a*-2HF that is a horizontal focus of the (1-2)th low area 211*a*-2.

A light input surface 211*a*-21 of the (1-2)th low area 211*a*-2 may be disposed in front of the light input surface 211*a*-11 of the (1-1)th low area 211*a*-1. Further, positions of a light output surface 211*a*-22 of the (1-2)th low area 211*a*-2 and the light output surface 211*a*-12 of the (1-1)th low area 211*a*-1 in the front-rear direction may correspond to each other. A width of the (1-2)th low area 211*a*-2 in the front-rear direction may be smaller than a width of the (1-1)th low area 211*a*-1 in the front-rear direction.

Further, a vertical focus 311*a*-2VF of the (1-2)th low light collector 311*a*-2 may correspond to the (1-2)th low vertical focus 211*a*-2VF. Further, referring to FIG. 17, a horizontal focus 311*a*-2HF of the (1-2)th low light collector 311*a*-2 may correspond to the (1-2)th low horizontal focus 211*a*-2HF. The (1-2)th low light collector 311*a*-2 may be disposed in front of the (1-1)th low light collector 311*a*-1.

Referring back to FIG. 14, the light beam output from the (2-2)th low area 212*a*-2 may form a peripheral portion of the low beam light distribution pattern. A (2-2)th low vertical focus 212*a*-2VF that is a vertical focus of the (2-2)th low area 212*a*-2 may be positioned behind a (2-2)th low horizontal focus 212*a*-2HF that is a horizontal focus of the (2-2)th low area 212*a*-2. A curvature of a light input surface 212*a*-21 of the (2-2)th low area 212*a*-2 in the horizontal direction may be greater than a curvature of a light output surface 212*a*-22 of the (2-2)th low area 212*a*-2 in the horizontal direction. In other words, a degree to which the light input surface 212*a*-21 of the (2-2)th low area 212*a*-2 is rearward convex may be greater than a degree to which the light output surface 212*a*-22 of the (2-2)th low area 212*a*-2 is forward convex.

Further, a vertical focus 312*a*-2VF of the (2-2)th low light collector 312*a*-2 may be positioned in front of the (2-2)th low vertical focus 212_a_-2VF. Further, referring to FIG. 15, a horizontal focus 312_a_-2HF of the (2-2)th low light collector 312_a_-2 may be positioned in front of the (2-2)th low horizontal focus 212_a_-2HF.

Referring back to FIG. 14, the light beam output from the (1-2)th high area 221_a_-2 may form a central portion of the high beam light distribution pattern. A position of a (1-2)th high vertical focus 221_a_-2VF that is a vertical focus of the (1-2)th high area 221_a_-2 may correspond to a position of a (1-2)th high horizontal focus 221_a_-2HF that is a horizontal focus of the (1-2)th high area 221_a_-2.

Further, a vertical focus 321_a_-2VF of the (1-2)th high light collector 321_a_-2 may be positioned in front of the (1-2)th high vertical focus 221_a_-2VF. Further, referring to FIG. 16, a horizontal focus 321_a_-2HF of the (1-2)th high light collector 321_a_-2 may be positioned in front of the (1-2)th high horizontal focus 221_a_-2HF.

Referring back to FIG. 14, the light beam output from the (2-2)th high area 222_a_-2 may form a peripheral portion of the high beam light distribution pattern. A (2-2)th high vertical focus 222_a_-2VF that is a vertical focus of the (2-2)th high area 222_a_-2 may be positioned behind a (2-2)th high horizontal focus 222_a_-2VF that is a horizontal focus of the (2-2)th high area 222_a_-2.

Further, a vertical focus 322_a_-2VF of the (2-2)th high light collector 322_a_-2 may be positioned in front of the (2-2)th high vertical focus 222_a_-2VF. Further, referring to FIG. 18, a horizontal focus 322_a_-2HF of the (2-2)th high light collector 322_a_-2 may be positioned in front of a (2-2)th high horizontal focus 222_a_-2HF.

Referring to FIG. 17, the (1-2)th shield 412 may have a shape corresponding to the first shield 410 according to the first embodiment. Referring to FIG. 15, the (2-2)th shield 422 may have a shape corresponding to the second shield 420 according to the first embodiment.

Further, the (2-2)th low area 212_a_-2, the (1-2)th high area 221_a_-2, the (1-2)th low area 211_a_-2, and the (2-2)th high area 222_a_-2 may be sequentially arranged in the vertical direction. For example, among the (2-2)th low area 212_a_-2, the (1-2)th high area 221_a_-2, the (1-2)th low area 211_a_-2, and the (2-2)th high area 222_a_-2, the (2-2)th low area 212_a_-2 may be disposed on the uppermost side, and the (2-2)th high area 222_a_-2 may be disposed on the lowermost side.

Further, each of the light input surface 211_a_-21 of the (1-2)th low area 211_a_-2, the light input surface 212_a_-21 of the (2-2)th low area 212_a_-2, and a light input surface 222_a_-21 of the (2-2)th high area 222_a_-2 may have an asymmetrical shape in the vertical direction. Further, a light input surface 221_a_-21 of the (1-2)th high area 221_a_-2 may have a symmetric shape in the vertical direction.

Further, the light output surface 212_a_-22 of the (2-2)th low area 212_a_-2, a light output surface 221_a_-22 of the (1-2)th high area 221_a_-2, the light output surface 211_a_-22 of the (1-2)th low area 221_a_-2, and a light output surface 222_a_-22 of the (2-2)th high area 222_a_-2 may have a shape sequentially connected in the vertical direction.

According to alight emitting module according to the present disclosure, alight distribution pattern that satisfies the law may be formed using one module, a volume of a lamp may be minimized, and thus the lamp may be slimmed.

Hereinabove, even though it has been described that all components constituting the embodiments of the present disclosure are combined into one part or are operated while combined with each other, the present disclosure is not necessarily limited to these embodiments. That is, all the components may be operated while selectively combined into one or more parts within the scope of the present disclosure. Further, terms such as "includes", "constitutes", or "have" described above mean that the corresponding component may be inherent unless otherwise stated, and thus should be construed as not excluding other components but further including other components. All terms including technical or scientific terms have the same meanings as those commonly understood by those skilled in the art to which the present disclosure pertains unless otherwise defined. The generally used terms defined in the dictionaries should be construed as having the meanings that coincide with the meanings of the contexts of the related technologies, and should not be construed as ideal or excessively formal meanings unless clearly defined in the present disclosure.

The above description is merely illustrative of the technical spirit of the present disclosure, and those skilled in the art to which the present disclosure belongs may make various modifications and changes without departing from the essential features of the present disclosure. Thus, the embodiments disclosed in the present disclosure are not intended to limit the technology spirit of the present disclosure, but are intended to describe the present disclosure, and the scope of the technical spirit of the present disclosure is not limited by these embodiments. The scope of protection of the present disclosure should be interpreted by the appended claims, and all technical spirits within the scope equivalent thereto should be interpreted as being included in the scope of the present disclosure.

What is claimed is:

1. A light emitting module comprising:

a light source configured to output a light beam; and a lens through which the light beam passes and forms a light distribution pattern as an output, wherein the lens includes:

a first area configured to output a first light beam for forming a first light distribution pattern that is a central portion of the light distribution pattern; and a second area configured to output a second light beam for forming a second light distribution pattern that has illuminance lower than that of the first light distribution pattern and is a peripheral portion of the light distribution pattern, and a diffusion angle of the second light beam in a left-right direction is greater than a diffusion angle of the first light beam in the left-right direction;

wherein a vertical focus and a horizontal focus of the first area correspond to each other, and a vertical focus and a horizontal focus of the second area are different from each other.

2. The light emitting module of claim 1, wherein a second horizontal focal distance that is a separation distance between the horizontal focus of the second area and the second area in a front-rear direction is smaller than a second vertical focal distance that is a separation distance between the vertical focus of the second area and the second area in the front-rear direction.

3. The light emitting module of claim 1, wherein a first horizontal focal distance that is a separation distance between the horizontal focus of the first area and the first area in a front-rear direction is greater than a second horizontal focal distance that is a separation distance between the horizontal focus of the second area and the second area in the front-rear direction.

4. The light emitting module of claim 3, wherein:

the first area includes a first light input surface into which the first light beam is input and which has a convex shape in a rearward direction that is a direction in which the lens faces the light source, the second area includes a second light input surface into which the second light beam is input and has a convex shape in the rearward direction, and a curvature of the first light input surface in a horizontal direction is smaller than a curvature of the second light input surface in the horizontal direction.

5. The light emitting module of claim 1, further comprising:

a third area configured to output a third light beam for forming a third light distribution pattern having illuminance lower than that of the first light distribution pattern, having illuminance higher than that of the second light distribution pattern, and provided between the first light distribution pattern and the second light distribution pattern.

6. The light emitting module of claim 5, wherein the first, second, and third areas are arranged in a vertical direction.

7. The light emitting module of claim 6, wherein the first area includes a first light output surface from which the first light beam is output and which extends in the vertical direction, the second area includes a second light output surface from which the second light beam is output and which extends in the vertical direction, the third area includes a third light output surface from which the third light beam is output and which extends in the vertical direction, and when the light emitting module is viewed from a side, the first light output surface, the second light output surface, and the third light output surface have shapes continuously connected to each other in the vertical direction.

8. The light emitting module of claim 7, wherein the first, second, and third areas are integrally formed.

9. The light emitting module of claim 5, wherein a plurality of the light sources are provided to correspond to the first, second, and third areas.

10. A lamp comprising:

a light emitting module configured to output a light beam for forming one or more of a low beam light distribution pattern and a high beam light distribution pattern, wherein the light emitting module comprises:

a light source configured to output a light beam; and a lens into which the light beam passes and is then output, the lens comprises:

a first low area configured to output a light beam for forming a first low beam light distribution pattern that is a central portion of the low beam light distribution pattern;

a second low area configured to output a light beam for forming a second low beam light distribution pattern that has illuminance lower than that of the first low beam light distribution pattern and is a peripheral portion of the low beam light distribution pattern;

a first high area configured to output a light beam for forming a first high beam light distribution pattern that is a central portion of the high beam light distribution pattern; and a second high area configured to output a light beam for forming a second high beam light distribution pattern that has illuminance lower than that of the first high beam light distribution pattern and is a peripheral portion of the high beam light distribution pattern;

wherein the second low area, first high area, first low area, and second high area are sequentially and alternately arranged in a vertical direction.

11. The lamp of claim 10, wherein the light emitting module includes a first light emitting module and a second light emitting module that are spaced apart from each other in a horizontal direction.

12. The lamp of claim 11, wherein a $(1\text{-}1)^{th}$ low horizontal focal distance that is a distance between a horizontal focus of a $(1\text{-}1)^{th}$ low area that is a first low area of the first light emitting module and the $(1\text{-}1)^{th}$ low area and a $(1\text{-}2)^{th}$ low horizontal focal distance that is a distance between a horizontal focus of a $(1\text{-}2)^{th}$ low area that is a first low area of the second light emitting module and the $(1\text{-}2)^{th}$ low area are different from each other, and a $(2\text{-}1)^{th}$ low horizontal focal distance that is a distance between a horizontal focus of a $(2\text{-}1)^{th}$ low area that is a second low area of the first light emitting module and the $(2\text{-}1)^{th}$ low area and a $(2\text{-}2)^{th}$ low horizontal focal distance that is a distance between a horizontal focus of a $(2\text{-}2)^{th}$ low area that is a second low area of the second light emitting module and the $(2\text{-}2)^{th}$ low area are different from each other.

* * * * *